(12) United States Patent
Nelson

(10) Patent No.: US 11,334,003 B2
(45) Date of Patent: May 17, 2022

(54) BINARY INK DEVELOPERS

(71) Applicant: Hewlett-Packard Development Company, L.P., Spring, TX (US)

(72) Inventor: Eric G. Nelson, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/255,611

(22) PCT Filed: Dec. 18, 2018

(86) PCT No.: PCT/US2018/066156
§ 371 (c)(1),
(2) Date: Dec. 23, 2020

(87) PCT Pub. No.: WO2020/131022
PCT Pub. Date: Jun. 25, 2020

(65) Prior Publication Data
US 2021/0302877 A1    Sep. 30, 2021

(51) Int. Cl.
*G03G 15/11* (2006.01)
*G03G 15/00* (2006.01)
*G06F 3/12* (2006.01)

(52) U.S. Cl.
CPC ......... *G03G 15/11* (2013.01); *G03G 15/5037* (2013.01); *G03G 15/5062* (2013.01); *G06F 3/12* (2013.01)

(58) Field of Classification Search
CPC ......... G03G 15/10–11; G03G 15/5037; G03G 21/0088; G03G 2215/0658
See application file for complete search history.

(56) References Cited

U.S. PATENT DOCUMENTS

| | | |
|---|---|---|
| 5,923,932 A | 7/1999 | Williams |
| 6,665,510 B1 | 12/2003 | Hirsch |
| 6,697,171 B1 | 2/2004 | Carter et al. |
| 7,492,485 B2 | 2/2009 | Ramesh et al. |
| 8,654,180 B2 | 2/2014 | Zomet et al. |
| 8,991,313 B2 | 3/2015 | Lopez et al. |
| 9,535,359 B2 | 1/2017 | Sandler et al. |
| 10,025,539 B2 | 7/2018 | Madasamy et al. |
| 2011/0102003 A1* | 5/2011 | Bhattacharyya ..... G03G 15/105 324/699 |
| 2015/0071665 A1 | 3/2015 | Lam et al. |
| 2016/0259283 A1 | 9/2016 | Mimura |
| 2016/0342108 A1 | 11/2016 | Montag |
| 2021/0208521 A1* | 7/2021 | Shoshani ............... G03G 15/55 |

FOREIGN PATENT DOCUMENTS

| | | | |
|---|---|---|---|
| WO | WO-2009048478 A1 | 4/2009 | |
| WO | WO-2018014977 A1 * | 1/2018 | ............ G03G 15/11 |
| WO | WO-2018124310 A1 | 5/2018 | |
| WO | WO-2018101485 | 6/2018 | |

\* cited by examiner

*Primary Examiner* — Carla J Therrien
(74) *Attorney, Agent, or Firm* — Fabian VanCott

(57) ABSTRACT

A binary ink developer (BID) may include a power supply electrically coupled to an electrode, a developer roller, and a cleaner roller. The BID may also include a controller to determine a level of image ghosting based on a sum of currents at the electrode, the developer roller and the cleaner roller, and instruct the power supply to provide an adjusted voltage to the cleaner roller in response to a determination of the level of image ghosting.

20 Claims, 7 Drawing Sheets

BINARY INK DEVELOPERS

BACKGROUND

Liquid electro-photographic (LEP) printing uses a liquid printing substance to form images on paper or other print substrates. The liquid printing substance includes suspended electrically charged pigments in a liquid. The pigments may include particles as small as 1 to 2 micrometers (μm) and can be accurately placed, using strictly controlled electrical fields, to ensure razor sharp images with high resolution and uniform gloss. LEP ink includes these particles and may be colored polymer particles dispersed in a carrier liquid. The polymer particles may also be referred to as toner particles and, accordingly, LEP printing fluid may be referred to as liquid toner.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
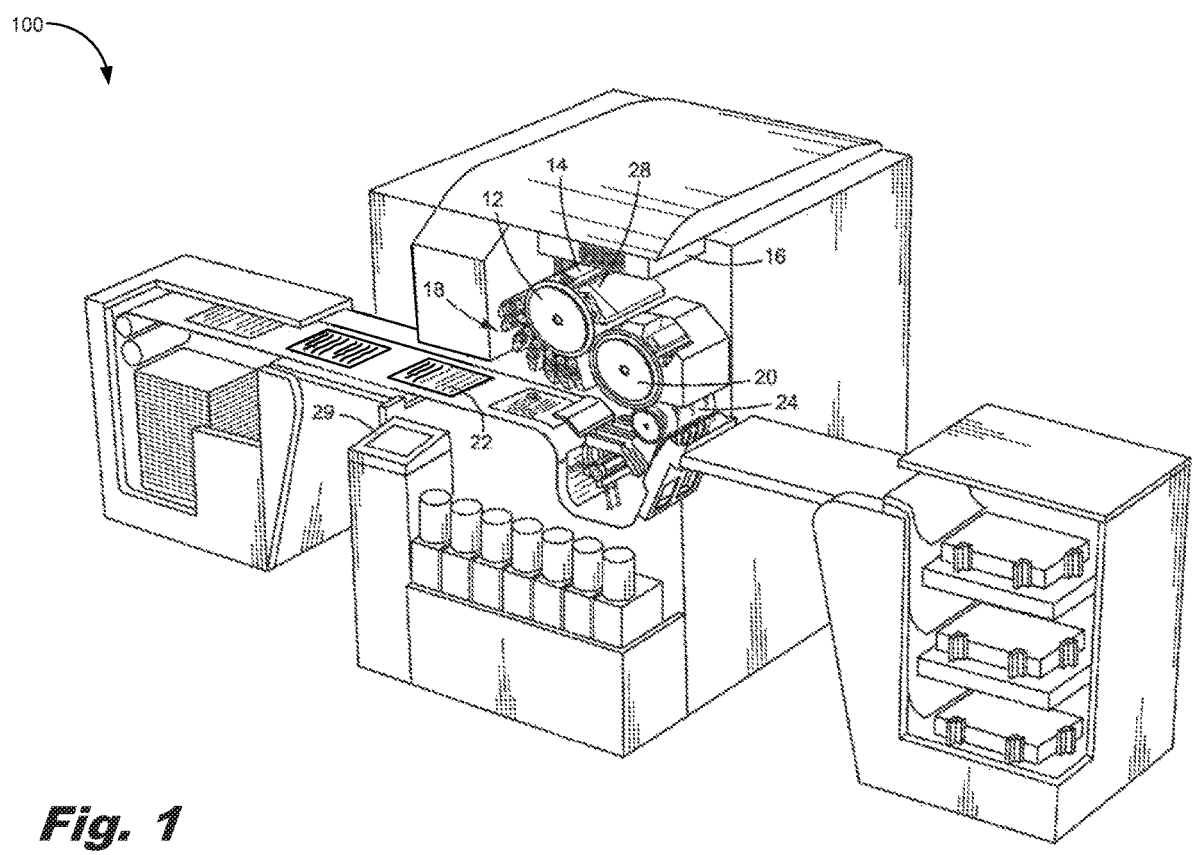
FIG. 1 is a perspective view of a print system, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The LEP printing process involves placing an electrostatic pattern of the desired printed image on a photoconductor and developing the image by applying a thin layer of the liquid toner to the charged photoconductor. Charged toner particles in the liquid adhere to the pattern of the desired image on the photoconductor. The liquid toner image is transferred from the photoconductor to a heated intermediate transfer member, evaporating much of the carrier liquid to dry the toner film to a near solid. The toner film is then pressed on to the cooler substrate and frozen in place at a nip between the intermediate transfer member and the substrate.

In one example, the LEP liquid toner may be silver-colored toner that includes metal particles such as aluminum particles rather than other ink pigments. The aluminum particles may be coated in a polymer and are included within a carrier liquid. However, when using silver-colored toner, image ghosting may occur due to the silver-colored toner's ability to be electrostatically charged both negatively or positively due to the electroconductivity of the metal particles within the silver-colored toner. Image ghosting is a print defect wherein latent images show up on a print as a repeated memory of the image down the page at a specific spacing from the original based on the circumference of a developer roller within the print device. The ghosted image may be either lighter or darker than the intended image. If the image ghosting print defect is not corrected then the associated print job may be rejected. Another solution may include modifying the print job design such that the ghosted image lands in a scrap area of a print medium on which the image is being printed. Print defects resulting in print job rejection by a consumer is clearly costly in time, materials, and continued consumer business. Redesigning the print job may be possible in some instances, but adds additional work, and causes increased waste and lower utilization of a printing area of the print medium.

Due to the reflectivity of the silver-colored toner, obtaining an optical density (OD) measurement is not a good assessment of ink thickness or appearance to the customer. Polarized OD measurement may be used to assess ghosting. However, the measurement equipment to perform this type of polarized OD measurement is specialized and expensive, and is not available on many printing devices. In one example, ghosting may be measured by under-printing the image with black and measuring OD on the press. In another example, a manual ghost calibration available to consumers includes printing several print jobs and allowing the consumer to sort through the print job and select prints that are most satisfactory.

In determining the level of ghosting occurring within a print job, a cleaner roller voltage may be adjusted as the voltage on the cleaner roller has a strong effect on ghosting. However, it is difficult and time consuming to assess ghosting on web presses with press room lighting. The appearance and detection of ghosting may be highly dependent upon the lighting within the room where printing is taking place, angle of lighting, and angle of viewing the print target such as a printed media in the case of a two-dimensional (2D) printing device. On web presses, for example, the print media path may be at a fixed location, and the room lighting may be fixed which makes assessment of ghosting on the printed medium difficult. It is possible to splice out the samples of printed medium, and observe the printed medium at another location. However, this also adds additional time and complexity to the process.

Examples described herein provide a binary ink developer (BID). The BID may include a power supply electrically coupled to an electrode, a developer roller, a squeegee roller, and a cleaner roller. The BID may also include a controller to determine a level of image ghosting based on a sum of currents at the electrode, the developer roller, the squeegee roller, and the cleaner roller. The controller may also instruct the power supply to provide an adjusted voltage to the cleaner roller in response to a determination of the level of image ghosting.

The controller may instruct the power supply to provide an adjusted voltage to the cleaner roller in response to a determination of the level of image ghosting. The controller, in response to a determination that the level of image ghosting is positive or negative, may instruct the power supply to provide an adjusted voltage to the cleaner roller to correct a subsequent impression of the developer roller. The sum of the currents is approximately proportional to the thickness of a printing substance on the developer roller. The controller may measure the level of image ghosting based on a current difference between the developer roller and a photo-imaging plate (PIP) transfer member such as, for example, a drum, a belt, or other transfer members. Throughout the description, the PIP will be referred to as a drum, but may include any type of transfer member. The controller causes the electrode and the squeegee roller to be electrically biased from the developer roller in order to move a printing substance to the developer roller, wherein the printing substance is electrically charged.

Examples described herein also provide a method of calibrating binary ink developer (BID) currents. The method may include, with a printing device including at least one BID, printing a test print. The method may also include measuring a level of image ghosting based on a sum of currents at an electrode, a developer roller, a squeegee roller, and a cleaner roller of the BID, determining if the image ghosting is with a threshold value, and in response to a determination that the image ghosting is not within the threshold value, i.e., less than the threshold value, adjusting a voltage to the cleaner roller.

Measuring the level of image ghosting based on the sum of currents at the electrode, the developer roller and the cleaner roller of the BID may include determining a ghost percentage. Determining the ghost percentage may include measuring a sum of the currents at the electrode, the developer roller, the squeegee roller, and the cleaner roller of the BID at a first revolution of transfer of printing material from the developer roller to a photo-imaging plate (PIP) drum to obtain a first current sum, measuring a sum of the currents at the electrode, the developer roller, squeegee roller, and the cleaner roller of the BID at a second revolution of transfer of the printing material from the developer roller to the PIP to obtain a second current sum, dividing the first current sum by the second current sum to obtain a first value, subtracting 1 from the first value to obtain a second value, and multiplying the second value by 100. Adjusting the voltage to the cleaner roller may include determining an adjusted cleaner roller voltage. The adjusted cleaner roller voltage may be determined by multiplying the ghost percentage by a gain value to obtain a third value. Adjusting the voltage to the cleaner roller comprises adjusting the voltage to the cleaner roller by the third value. The gain value is an empirically-determined value. The method may also include applying the adjusted cleaner roller voltage in a closed loop control.

Examples described herein also provide a non-transitory computer readable medium including computer usable program code embodied therewith. The computer usable program code may, when executed by a processor, measure a level of image ghosting within a test print based on a sum of currents at an electrode, a developer roller, a squeegee roller, and a cleaner roller of a binary ink developer (BID), determine if the image ghosting is with a threshold value, and in response to a determination that the image ghosting is not within the threshold value, empirically adjusting the voltage to the cleaner roller through a closed loop.

The measuring of the level of image ghosting based on the sum of currents at the electrode, the developer roller, the squeegee roller, and the cleaner roller of the BID may include determining a ghost percentage. The ghost percentage may be determined by measuring a sum of the currents at the electrode, the developer roller, the squeegee roller, and the cleaner roller of the BID at a first revolution of transfer of printing material from the developer roller to a photo-imaging plate (PIP) drum to obtain a first current sum, measuring a sum of the currents at the electrode, the developer roller, the squeegee roller, and the cleaner roller of the BID at a second revolution of transfer of the printing material from the developer roller to the PIP, dividing the first current sum by the second current sum to obtain a first value, subtracting 1 from the first value to obtain a second value, and multiplying the second value by 100. Adjusting the voltage to the cleaner roller may include determining an adjusted cleaner roller voltage. The adjusted cleaner roller voltage may be determined by multiplying the ghost percentage by a gain value to obtain a third value. Adjusting the voltage to the cleaner roller comprises adjusting the voltage to the cleaner roller by the third value.

Measuring the level of image ghosting within the test print may include measuring the level of image ghosting within the test print based on the sum of currents at the electrode, the developer roller, the cleaner roller and a squeegee roller of the BID. The computer readable medium may also include comprising computer usable program code to, when executed by the processor, and in response to a determination that the image ghosting is not within the threshold value, determine whether a level of image ghosting is positive or negative, and instruct a power supply to provide an adjusted voltage to the cleaner roller to correct a second impression of the developer roller. The computer readable medium may also include computer usable program code to, when executed by the processor electrically bias the electrode and the squeegee roller from the developer roller to move a printing substance to the developer roller, wherein the printing substance is electrically charged.

Figure 2:
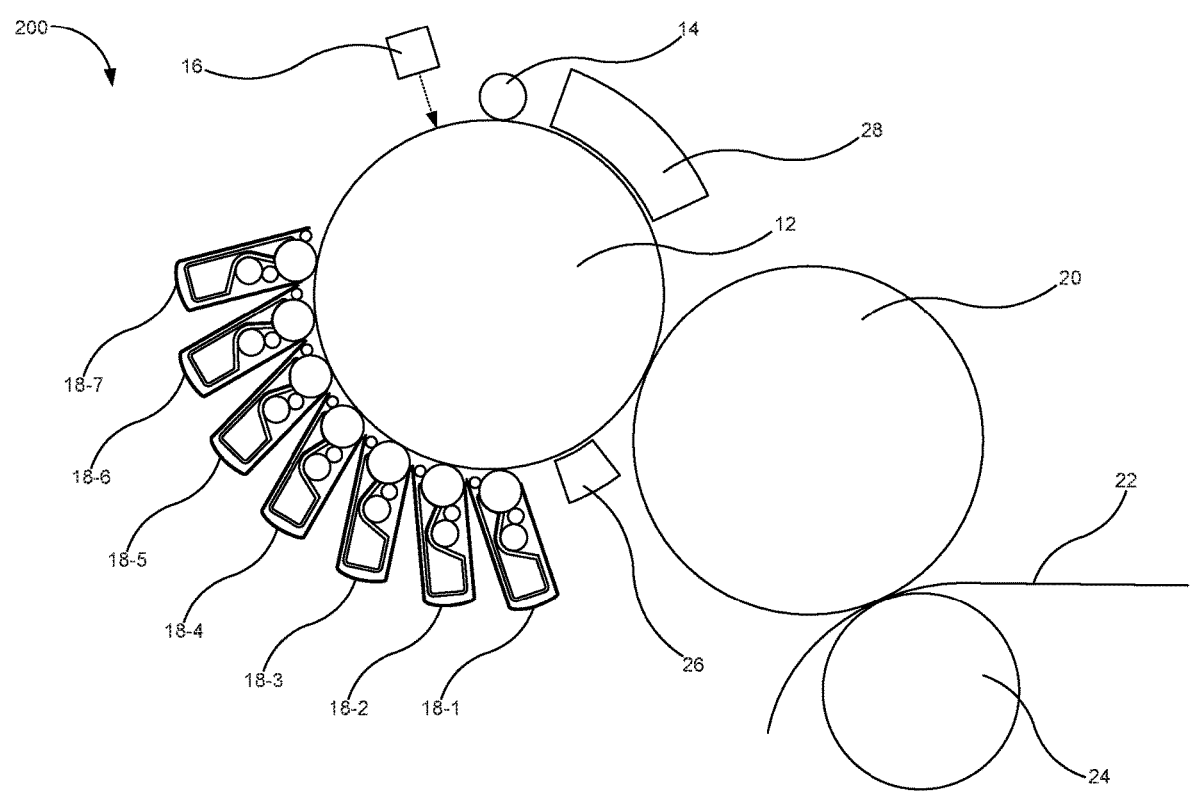
FIG. 2 is a cross-sectional, block diagram of a printing device within the print system, according to an example of the principles described herein.

Turning now to the figures, FIG. 1 is a perspective view of a print system (100), according to an example of the principles described herein. Further, FIG. 2 is a cross-sectional, block diagram of a printing device (200) within the print system (100), according to an example of the principles described herein. The printing device (200) includes elements within the print system (100) that are used to form the image on a print medium (22). The print system (100) may be a liquid electro-photographic (LEP) printing system. In the print system (100), a uniform electrostatic charge may be applied to a photoconductive surface such as, for example, the outer surface of a photo-imaging plate (PIP) drum (12) by a charge roller (14), a scorotron or other suitable charging device (14). A scanning laser or other suitable photo imaging device (16) may be activated to expose selected areas on the PIP drum (12) to light in the pattern of the desired printed image. A thin layer of liquid toner may be applied to the patterned the PIP drum (12) using at least one developer (18-1, 18-2, 18-3, 18-4, 18-5, 18-6, 18-7, collectively referred to herein as 18) such as a binary ink developer (BID). The BIDs (18) may output toner with pigments such as cyan, magenta, yellow, and black (CMYK) as well as the silver-colored toner or other electrically chargeable toner described herein. Thus, the BIDs (18) provide different color planes that form the image as printed on the print medium (22).

The developer (18) represents a complex unit that supplies different color toners to a series of small rollers that rotate against a developer roller of the developer (18). The developer roller of the developer (18) in turn rotates against the PIP drum (12). At least one of the developers (18) may include a power supply electrically coupled to an electrode, a developer roller, a squeegee roller, and a cleaner roller, and a controller to determine a level of image ghosting based on a sum of currents at the electrode, the developer roller, the squeegee roller, and the cleaner roller. Further, the methods described herein may include calibrating binary ink developer (BID) currents. The method may include, with a printing device including at least one BID, printing a test print; measuring a level of image ghosting based on a sum of currents at an electrode, a developer roller, a squeegee roller, and a cleaner roller of the BID, determining if the image ghosting is with a threshold value, and, in response to a determination that the image ghosting is not within the threshold value, adjusting a voltage to the cleaner roller.

The latent image on the PIP drum (12) is developed through the application of the liquid toner which adheres to the charged pattern on the PIP drum (12), developing the latent electrostatic image into a toner image. The toner image is transferred from the PIP drum (12) to an intermediate transfer drum/member (ITM) (20), and then from the ITM (20) to sheets or a web of print medium (22) such as paper as it passes between the ITM (20) and an impression drum (24) or other pressure roller. The ITM (20) may include a removable, replaceable blanket wrapped around a drum. The soft, compliant blanket is heated to evaporate most of the liquid carrier component of the toner so that the toner dries to a very thin semisolid film before being transferred to the print medium (22). The toner film, for example, may be dried to about 90% solid. Usually approximately 3 to 10% of the original liquid carrier remains after drying. The toner film on the hot blanket of the ITM (20) may be pressed onto a cooling substrate (22) and frozen in place at the nip between ITM (20) and the (24). A discharging device (26) removes residual charge from the PIP drum (12) and toner residue may be removed at a cleaning station (28) in preparation for developing the next image or for applying the next toner color plane.

The print system (100) also includes a controller (29). The controller (29) represents the programming, processors and associated memories, and the electronic circuitry and components needed to control the operative elements of the print system (100).

Figure 3:
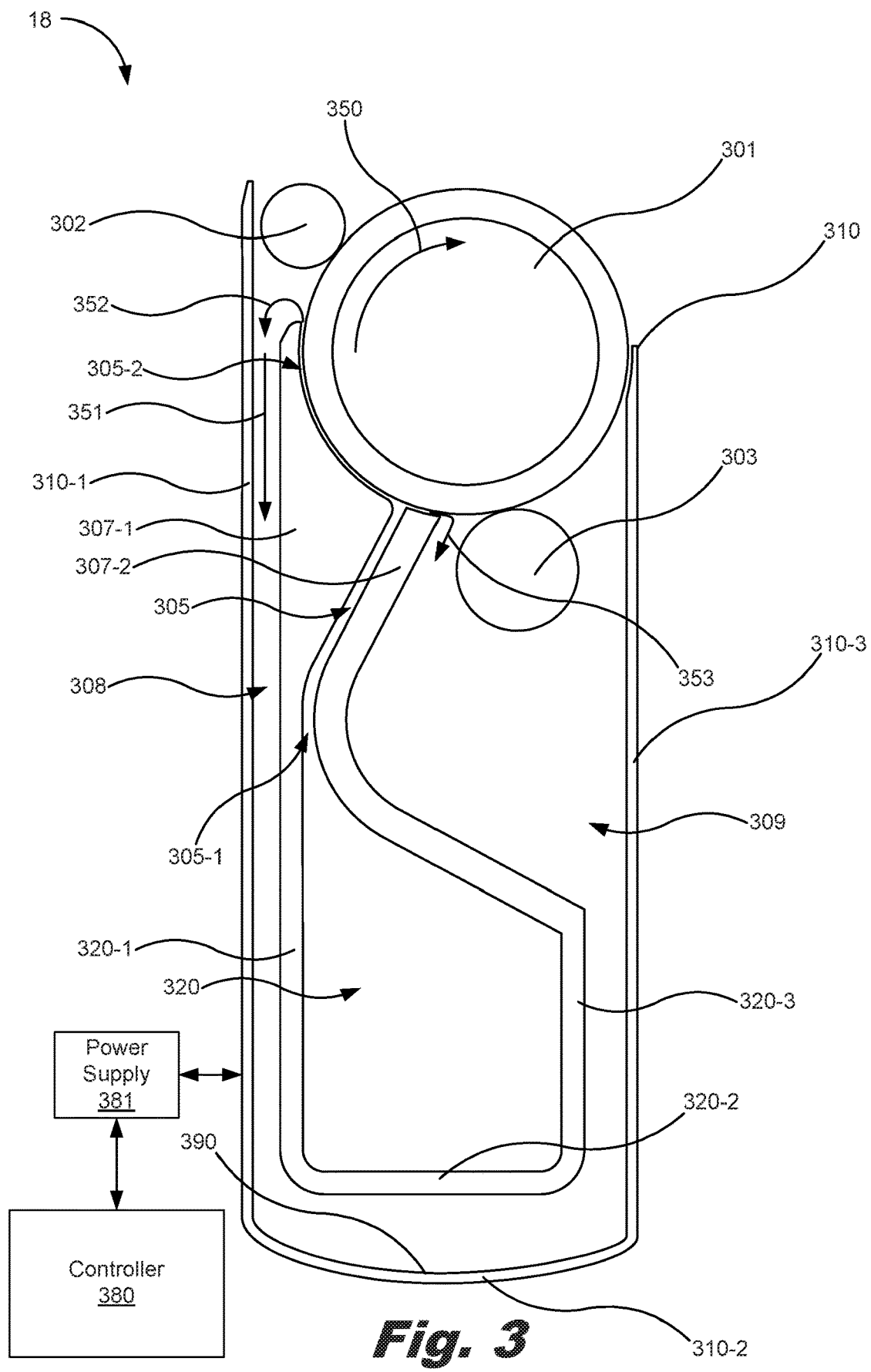
FIG. 3 is a cross-sectional, block diagram of a binary ink developer (BID), according to an example of the principles described herein.

FIG. 3 is a cross-sectional, block diagram of a binary ink developer (BID) (18), according to an example of the principles described herein. The BID (18) includes a housing (310) including housing walls (310-1, 310-2, 310-3). The housing walls (310-1, 310-2, 310-3) surround and enclose portions of the BID (18). Further, the BID (18) includes an overflow side (308) and a cleaning side (309), as described herein.

The BID (18) includes a developer roller (301). The developer roller (301) rotates about an axis in a first direction, for example a clockwise direction, as indicated by arrow (350) in FIG. 3. The surface of the developer roller (301) receives the liquid toner including toner particles that include colorant and a polymer in a dielectric carrier fluid. The toner particles respond to an electric field. Moreover, the surface of the developer roller (301) maintains a voltage. The developer roller (301) extends above and out of a top of the housing (310) of the BID (18) in order to contact the PIP drum (12) to transfer liquid toner applied to the developer roller (301) to the PIP drum (12).

The BID (18) further includes a pair of electrodes (307-1, 307-2). A first electrode (307-1) of the pair is adjacent to and spaced from a second electrode (307-2) of the pair of electrodes (307-1, 307-2). A gap (305) between the spaced apart first (307-1) and second (307-2) electrodes is sufficient for fluid flow between the electrodes (307-1, 307-2). In an example, the electrodes (307-1, 307-2) each extend across a portion of a length of the developer roller (301). For example, both of the developer roller (301) and the electrodes (307-1, 307-2) may extend into the page of FIG. 3. The ends (i.e., top ends) of the electrodes (307-1, 307-2) are adjacent to and spaced from the surface of the developer roller (301) by a gap (305-2) sufficient for fluid flow between the developer roller (301) and the ends of the electrodes (307-1, 307-2). The electrodes (307-1, 307-2) maintain a voltage that differs from the voltage maintained by the developer roller (301). The voltage difference produces an electric field between the ends of the electrodes (307-1, 307-2) and a surface of the developer roller (301). The electrodes (307-1, 307-2) are electrically biased to a higher voltage relative to the developer roller (301) in order to create an electric field between the electrodes (307-1, 307-2) and the developer roller (301). This electrical bias charges the printing material and moves the solid portion of the printing material toward the surface of the developer roller (301). In one example, the electrodes (307-1, 307-2) may have a relatively more negative voltage than the developer roller (301). In other words, the electrodes (307-1, 307-2) have an electrical voltage that is relatively higher in magnitude then the developer roller (301) but negative in polarity and with a lower in absolute voltage relative to the developer roller (301). In one example, the developer roller (301) may be electrically charged at −450 V while the electrodes (307-1, 307-2) may be electrically charged at −1200 V. Thus, the electrodes (307-1, 307-2) have a voltage that differs in magnitude from the voltage maintained on the developer roller (301).

The remaining portions of the electrodes (307-1, 307-2) are adjacent to and facilitate establishing a first end of a chamber (320). Chamber walls (320-1, 320-2, 320-3) enclose and define the chamber (320) away from the first end of the chamber (320). The chamber (320) also may be referred to as a fluid chamber (320), for example. In some examples, the bottom end of the second electrode (307-2) is connected to a terminus end of the chamber wall (320-3) of the chamber (320) and the bottom end of the first electrode (307-1) is connected to a terminus end of the chamber wall (320-1) of the chamber (320).

The chamber (320) houses the fluid printing substance that includes a liquid component and a largely solid or relatively solid component as described herein. For example, the printing fluid may be the liquid toner or an ink including toner particles (i.e., the largely solid component) suspended in a dielectric carrier fluid (i.e., the liquid component). A variety of liquid toners or inks (i.e., fluids) may be employed by the BID (18) including, but not limited to, ELECTROINK® manufactured and distributed by HP Inc., Palo Alto, Calif., USA. The printing fluid (i.e., liquid toner or ink) housed by the fluid chamber (320) provides a source of fluid to the surface of the developer roller (301).

During operation, the fluid from the chamber (320) flows between the spaced apart electrodes (307-1, 307-2) from an inlet (305-1) through the gap (305) between the electrodes (307-1, 307-2) and around the ends of the electrodes (307-1, 307-2) adjacent to the developer roller (301). Flow of the printing fluid into the inlet (305-1) and between the electrodes (307-1, 307-2) may be provided by a pressure of the fluid in the chamber (320), for example. Fluid flow may be further facilitated by rotation of the developer roller (301), in some examples. In one example, some of the fluid, or more precisely, the solid component of the fluid such as, for example, the colorant or toner particles, along with a relatively smaller portion of the liquid component, adhere to and are carried by a surface of the rotating developer roller (301). According to various examples, the adhesion is promoted by the electric field between the narrow ends of the electrodes (307-1, 307-2) and the developer roller (301)

acting on a charge of the solid component of the fluid such as, for example, the charged particles of the solid component of the print fluid.

The chamber (320) may be fluidically coupled to an external reservoir, and the printing fluid in the chamber (320) may be provided and replenished from the external reservoir. Further, in some examples, the printing fluid in the chamber (320) is maintained under pressure by providing the printing fluid from the external reservoir. For example, a pump may be used to pump the printing fluid under pressure into the chamber (320) from the external reservoir. The chamber (320), as defined by the chamber walls (320-1, 320-2, 320-3) and the bottom ends of the electrodes (307-1, 307-2), is further substantially surrounded by the housing walls (310-1, 310-2, 310-3) of the BID (18). The housing walls (310-1, 310-2, 310-3) further define and enclose a collection tray (390) near a bottom end of the housing. The collection tray (390) serves to receive and collect excess printing fluid from the surface of the developer roller (301) at the cleaning side (309) of the BID (18), as is further described below. The excess printing fluid may include residual amounts of the solid component of the fluid that remain after, for example, the developer roller (301) has rotated about one revolution. In addition, the collection tray (390) may receive and collect fluid from an overflow flow path via the overflow side (308) of the BID (18). Fluid communication extending from the overflow flow path to the collection tray (390) along and within the overflow side (308) is illustrated by arrow (351) in FIG. 3, for example. The received and collected fluid and excess solid component from the collection tray (390) may be provided to the external reservoir for filtering, mixing and reuse, for example.

The BID (18) further includes a squeegee roller (302) adjacent to the developer roller (301) and the first electrode (307-1) of the electrode pair. A surface of the squeegee roller (302) may be substantially in contact with the surface of the developer roller (301). In one example, the surface of the squeegee roller (302) may maintain a voltage that differs in magnitude from the voltage maintained on the developer roller (301). Moreover, the squeegee roller (302) may rotate in a second direction that is opposite to the first direction of the developer roller (301) rotation. The direction of rotation of the developer roller is indicated by arrow (350). The squeegee roller (302) acts to compact and/or reduce a thickness of a portion of the printing fluid that adheres to and is carried by the developer roller (301). For example, the squeegee roller (302) may compact a solid component of the printing fluid and reduce or substantially remove the liquid component of the printing fluid. In one example, the squeegee roller (302) may include an electrically insulating surface such as a ceramic surface in order to reduce or eliminate electrical currents at the squeegee roller (302) in influencing the electrical charge on the developer roller (301).

The BID (18) may also include a cleaner roller (303). The cleaner roller (303) removes printing fluid from the developer roller (301) which has not been transferred to the surface of the ITM (20) or the print medium (22). The removed printing fluid is mixed with the overflow fluid that overflows from the second electrode (307-2) as indicated by arrow (353). The printing fluid then is moved to the collection tray (390). The cleaner roller (303) may include a roller having a surface charged so as to attract and remove the printing fluid from the surface of the developer roller (301). In an example in which the developer roller (301) has a charge of approximately negative 450 volts, the cleaner roller (303) may have a charge of approximately negative 125 volts. The cleaner roller (303) is located in close proximity to the developer roller (301) near an upper portion of electrode (307-2). Although the cleaner roller (303) is illustrated as a roller, the cleaner roller (303) may alternatively include a belt movably supported by at least one roller, wherein a surface of the belt is positioned proximate to the developer roller (301) and may be electrically charged for removing printing fluid from the developer roller (301).

In some examples, the squeegee roller (302) may be referred to as a squeegee roller due to the 'squeegee' action it imparts on the surface of the developer roller (301) in removing the liquid component of the printing fluid. The squeegee roller (302) may also be spaced from the first electrode (307-1) by a gap. The gap may be sufficient for fluid flow between the squeegee roller (302) and the first electrode (307-1). In some examples, the squeegee roller (302) is located between the developer roller (301) and a terminus end of the housing wall (310-1) of the BID.

The BID (18) may include flow paths (308, 309) for fluid to recirculate in the print system (100). A first flow path is referred to as the overflow path (352). The overflow path indicated by arrow (352) includes a fluid pathway generally extending from the chamber (320) at the inlet (305-1), through the gap (305) between the electrode pair (307-1, 307-2) and between the developer roller (301) and the first electrode (307-1). The overflow path (352) continues between the first electrode (307-1) and the squeegee roller (302), and back to the collection tray (390). The fluid may then flow from the BID (18) to an ink tank where it is then pumped back into the chamber (320) of the BID (18). In a similar manner, fluid that overflows from the second electrode (307-2) as indicated by arrow (353) collects in the collection tray (390) and recirculated in the same manner. This overflow path indicated by arrow (353) may be referred to as the cleaning flow path (353).

The BID (18) may also include a cleaning flow path indicated by arrow (353). The cleaning flow path (353) extends from the chamber (320) at the inlet (305-1), through the gap between the electrode pair (307-1, 307-2) and between the second electrode (307-2) and the developer roller (301). The cleaning flow path 170 continues on past a further series of rollers, which are described further below, and into the collection tray (390).

The overflow flow path (352) enables printing fluid to escape or be released from the gap (350-2) between the first electrode (307-1) and the developer roller (301) and enter the overflow side (308) of the BID (18) between the housing wall (310-3) and the chamber wall (320-3). The printing fluid that escapes via the overflow flow path ultimately ends up in the collection tray (390).

As mentioned, the printing fluid may be an LEP liquid toner that is silver-colored and includes metal particles such as aluminum particles rather than other ink pigments. The aluminum particles may be coated in a polymer and are included with the carrier liquid. Because the metal particles within the LEP liquid toner are electrically conductive, the voltages and electrical currents among and between the electrode, the developer roller, the cleaner roller, and the squeegee roller may be negatively affected such that image ghosting may occur. Thus, an undesirable image ghosting may occur due to the silver-colored toner's due to its electroconductivity of the metal particles within the silver-colored toner. Image ghosting is a print defect wherein latent images show up on a print as a repeated memory of the image down the page at a specific spacing from the original based on the circumference of a developer roller within the print device. The ghosted image may be either lighter or darker than the intended image. If the image ghosting print defect is not corrected then the associated print job may be rejected.

Because of the use of a conductive, silver-colored LEP liquid toner within the print system (100), the developer roller (301), the squeegee roller (302), and the cleaner roller (303) may be manufactured to be more electrically resistive in order to ensure that the conductive, silver-colored LEP liquid toner does not electrically interact with the developer roller (301), the squeegee roller (302), and the cleaner roller (303). However, due to the increased resistivities of the developer roller (301), the squeegee roller (302), and the cleaner roller (303), these elements' ability to move electrical charge from off their surfaces or the ability to do so as quickly may be reduced, resulting in the image ghosting occurring within the print system (100). Thus, controlling adjusted voltages to the cleaner roller (303) serves to reduce or eliminate the image ghosting caused by the increased resistivities of the developer roller (301), the squeegee roller (302), and the cleaner roller (303).

Since metal is electrically conductive, the aluminum particles within the silver-colored toner may drive high currents and may be charged negatively or positively where as other toners may be charged negatively. In the examples described herein, the image ghosting due to the inclusion of the electrically conductive, silver-colored LEP liquid toner is corrected by detecting electrical currents present at least one of the developer roller (301), the squeegee roller (302), the cleaner roller (303), and the electrodes (307-1, 307-2), and applying voltages to at least one of the developer roller (301), the squeegee roller (302), the cleaner roller (303), and the electrodes (307-1, 307-2) in order to correct the image ghosting. In one example, the BID (18) may include a power supply (381) electrically coupled to the electrodes (307-1, 307-2), the developer roller (301), the squeegee roller (302), and the cleaner roller (303). In one example, the power supply provides a voltage to each of the developer roller (301), the squeegee roller (302), and the cleaner roller (303). In another example, a power supply (381) may be provided to each of the developer roller (301), the squeegee roller (302), and the cleaner roller (303) to individually control the voltages provided to these elements. A controller (380) may also be included to determine a level of image ghosting using at least one method. A first method of determining a level of image ghosting may be based on a sum of all the currents at the electrodes (307-1, 307-2), the developer roller (301), the squeegee roller (302), and the cleaner roller, and, with the controller (380), instruct the power supply (381) to provide an adjusted voltage to the cleaner roller (303) in response to a determination of the level of image ghosting. In this manner, the cleaner roller (303) and the voltage applied thereto may be used to remove residual electrical charge present on the surface of the developer roller (301) as well as any residual printing fluid. In a second method, a current between the developer roller (301) and the PIP drum (12) of the print system (100) may be measured. The controller (380) may instruct the power supply (381) to provide an adjusted voltage to the cleaner roller (303) in response to a determination of the level of image ghosting.

The controller (380) measures a level of image ghosting based on a sum of currents at the electrodes (307-1, 307-2), the developer roller (301), the cleaner roller (303), and the squeegee roller (302) of the BID (18). The sum of the currents at the electrodes (307-1, 307-2), the developer roller (301), the cleaner roller (303), and the squeegee roller (302) of the BID (18) is approximately proportional to the thickness of the printing fluid on the developer roller (303) as applied by the electrodes (307-1, 307-2) and squeegee roller (302). The level of image ghosting occurring within the print system (100) may be determined along with whether that level of image ghosting exceeds a threshold value. The controller (380) may, in response to a determination that the image ghosting is not within the threshold value and is outside acceptable parameters, adjust the voltage to the cleaner roller (303).

Measuring the level of image ghosting based on the sum of currents at the electrodes (307-1, 307-2), the developer roller (301), the cleaner roller (303), and the squeegee roller (302) of the BID (18) may include determining a ghost percentage. The ghost percentage is determined by measuring a sum of the currents at the electrodes (307-1, 307-2), the developer roller (301), the cleaner roller (303), and the squeegee roller (302) of the BID (18) at a first impression of the developer roller (301) to obtain a first current sum, and measuring a sum of the currents at the electrodes (307-1, 307-2), the developer roller (301), the cleaner roller (303), and the squeegee roller (302) of the BID (18) at a second revolution of the developer roller (301) transferring printing material to the PIP drum (12) to obtain a second current sum. The first current sum is divided by the second current sum to obtain a first value. The value of 1 is subtracted from the first value to obtain a second value. The second value is then multiplied by 100 to obtain the ghost percentage. Thus, the ghost percentage may be obtained by Equation 1:

$$\text{Ghost \%} = ((\text{First Current Sum})/(\text{Second Current Sum}) - 1) \times 100 \quad \text{Eq. 1}$$

The controller (380) may determine if the ghost percentage is outside the threshold value, and adjust the voltage to the cleaner roller (303) if it is. The adjustment of the voltage applied by the power supply (381) may include determining an adjusted cleaner roller voltage. Determining the adjusted cleaner roller voltage includes determining an adjustment value by multiplying the ghost percentage obtained using Equation 1 by a gain value as indicated in Equation 2.

$$\text{Adjustment Value} = \text{Ghost \%} \times \text{Gain Value} \quad \text{Eq. 2}$$

The gain value represents the adjustment factor for a closed loop control of the voltages supplied to the electrodes (307-1, 307-2), the developer roller (301), the cleaner roller (303), and/or the squeegee roller (302) of the BID (18). The gain value may be adjusted within the closed loop process provided by the controller (380) in an empirical manner such that detected levels and working gain values may be applied as they work to remove the image ghosting. In this manner, the empirically-obtained gain value provides a fast and stable calibration to the print system (100) in removing the image ghosting. In response to a determination that the level of image ghosting is positive or negative resulting in an image ghost appearing downstream from an initial imprint of the printing fluid, the controller (380) may instruct the power supply (381) to provide an adjusted voltage to the cleaner roller to correct a second impression of the developer roller. The adjusted voltage applied to the cleaner roller (303) (i.e., Adjusted Cleaner Roller Voltage (ACRV)) may be determined by adding the adjustment value to the original cleaner roller voltage as indicated in Equation 3:

$$\text{ACRV} = \text{Original Voltage} + \text{Adjustment Value} \quad \text{Eq. 3}$$

In one example, instead of or in addition to measuring the level of image ghosting based on the sum of currents at the electrodes (307-1, 307-2), the developer roller (301), the cleaner roller (303), and the squeegee roller (302) of the BID (18), the level of image ghosting may also be determined based on a current between the developer roller (301) and the photo-imaging plate (PIP) drum (12). In this example, the sum of the currents at the electrodes (307-1, 307-2), the developer roller (301), the cleaner roller (303), and the squeegee roller (302) of the BID (18) is equal to the current between the developer roller (301) and the PIP drum (12). Thus, in this example, the current between the developer roller (301) and the PIP drum (12) may be used to determine the ghost percentage in place of the sum of the currents at the electrodes (307-1, 307-2), the developer roller (301), the cleaner roller (303), and the squeegee roller (302) of the BID (18) in Equations 1 and 2 above. The voltage provided to the cleaner roller (303) may then be based on the gain value obtained as well as the current between the developer roller (301) and the PIP drum (12).

Figure 4:
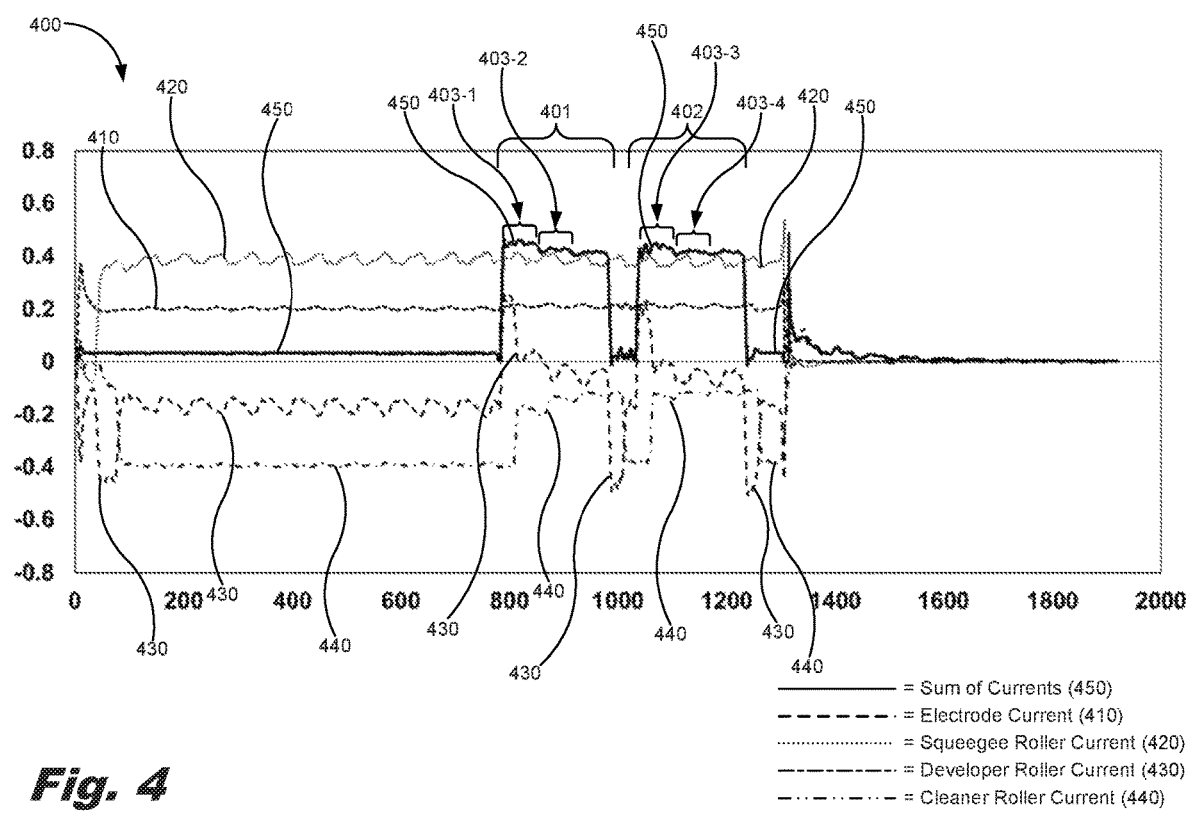
FIG. 4 is a chart indicating a positive ghost, according to an example of the principles described herein.

FIG. 4 is a chart (400) indicating a positive ghost, according to an example of the principles described herein. As mentioned herein, the image ghosting may appear offset from an initial imprint of the printing fluid. In the chart (400), the vertical axis indicates the current in milliamps (mA) and the horizontal axis indicates the time in milliseconds (msec) during an impression event from the developer roller (301) to the PIP drum (12). The BID (18) being analyzed in the chart (400) is the BID (18) that is used to print the silver-colored, electrically chargeable print fluid onto the print medium (22).

The electrical current at the electrodes (307-1, 307-2) as indicated by signal line (410), the electrical current at the squeegee roller (302) as indicated by signal line (420), the electrical current at the developer roller (301) as indicated by signal line (430), and the electrical current at the cleaner roller (303) as indicated by signal line (440) are represented in the chart (400). The electrical currents (410, 420, 430, 440) are indicated in the chart (400) shortly before impression of the developer roller (301) onto the PIP drum (12), during a first rotation (401) and second rotation (402) of the developer roller (301) onto the PIP drum (12), and shortly after the first and second rotations (401, 402). Further, a transfer current ($T_0$ or "transfer zero") (450) between the developer roller (301) and the PIP drum (12) is also indicated in the chart (400). To measure the level of image ghosting using the currents of the electrodes (307-1, 307-2), the squeegee roller (302), the developer roller (301), and the cleaner roller (303), a full page is printed in solid silver-colored toner from the BID (18) in order to obtain the strongest signal possible. In other words, the more ink transferred the higher the current sum is. Conversely, if a blank page were printed there would be no signal. Further, a complex image page may not be appropriate since the current would vary with the image itself. Thus, in one example, a full page of solid silver-colored toner is printed on the print medium (22).

As indicated in the chart (400), the polarity of the currents (410, 420) at the electrodes (307-1, 307-2) and the squeegee roller (302) which are acting to adhere printing fluid to the developer roller (301) are opposite the current (440) at the cleaner roller (303) which is pulling the printing fluid away from the developer roller (301). In portions of the chart (400) where the printing fluid is not being transferred between the developer roller (301) and the PIP drum (12), the sum of the currents indicated by $T_0$ (450) has a value of zero or close to zero with some level of leakage current present. Further, the sum of the currents indicated by $T_0$ (450) also indicates a thickness of the printing fluid on the developer roller (301). As indicated by the brackets (401, 402), a first application of the developer roller (301) against the PIP drum (12) and a second application of the developer roller (301) against the PIP drum (12), respectively, are included. The first application (401) and the second application (402) may also be referred to as separations where the developer roller (301) of the BID (18) comes into contact with the PIP drum (12). Different BIDs (18) that print different colors of printing fluid may be activated before and after the activation of the BID (18) depicted in the chart (400).

Within each of the first application (401) of the developer roller (301) against the PIP drum (12) and a second application (402) of the developer roller (301) against the PIP drum (12), a first revolution (403-1, 403-3) of the developer roller (301) and a second revolution (403-2, 403-4) of the developer roller (301) are indicated by brackets. It is noted that a full page is being printed in FIG. 4 in each separation (401, 402). As depicted in the chart (400), the current in the first revolution (403-1, 403-3) in each of the separations (401, 402) is higher relative to the second revolution (403-2, 403-4). This indicates that the thickness of the printing fluid on the developer roller (301) is higher in the first revolution (403-1, 403-3) relative to the thickness of the printing fluid on the developer roller during the second revolution (403-2, 403-4), and the second revolution (403-2, 403-4) is visible as a ghost image on the PIP drum (12) and subsequently on the ITM drum (20) and the print medium (22). In other words, the first revolution (403-1, 403-3) of the developer roller (301) in the example of FIG. 4 has a relatively higher optical density and higher current relative to the second revolution (403-2, 403-4). This may be referred to as positive ghost imaging.

In order to correct the positive ghost imaging depicted in FIG. 4, the controller (380) would function as described in connection with FIG. 3 to adjust the current applied to the cleaner roller (303). Application of the methods performed by the controller (380) would result in the average currents during the first revolution (403-1, 403-3) and the second revolution (403-2, 403-4) becoming equal or approximately equal resulting in the removal or avoidance of image ghosting. The difference between the average current in the first revolution (403-1, 403-3) and the second revolution (403-2, 403-4) may be determined by the controller (380), and the voltage supplied by the power supply (381) to the cleaner roller (303) may be adjusted to remove the image ghosting.

Figure 5:
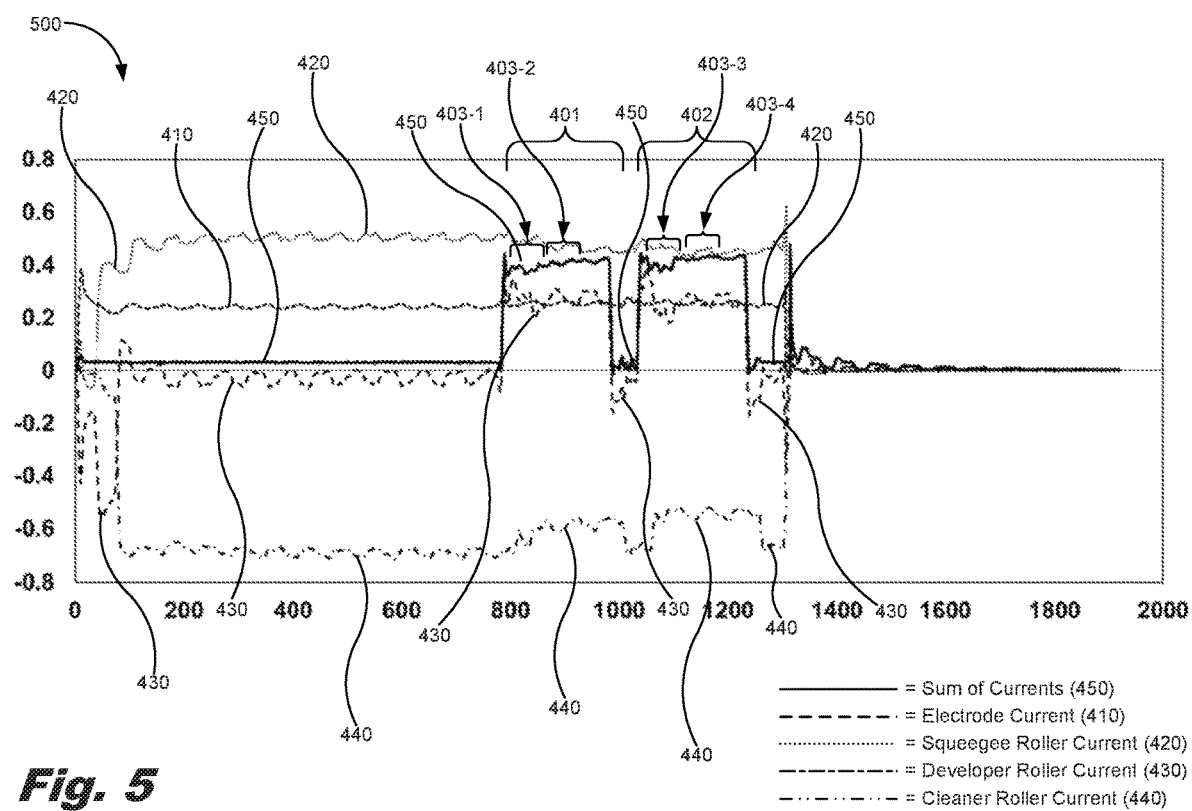
FIG. 5 is a chart indicating a negative ghost, according to an example of the principles described herein.

FIG. 5 is a chart (500) indicating a negative ghost, according to an example of the principles described herein. The negative image ghosting charted in the chart (500) is similar to the positive image ghosting charted in the chart (400) of FIG. 4, and similar elements have been identified relative to elements of the chart (400) of FIG. 4 using the same indicators. The difference between the chart (400) of FIG. 4 and the chart (500) of FIG. 5 is that within each of the first application (401) of the developer roller (301) against the PIP drum (12) and a second application (402) of the developer roller (301) against the PIP drum (12), a first revolution (403-1, 403-3) of the developer roller (301) and a second revolution (403-2, 403-4) of the developer roller (301) have an relative currents opposite those indicated in the chart (400) of FIG. 4. As depicted in the chart (500) of FIG. 5, the current in the first revolution (403-1, 403-3) in each of the separations (401, 402) is lower relative to the second revolution (403-2, 403-4). This indicates that the thickness of the printing fluid on the developer roller (301) is lower in the first revolution (403-1, 403-3) relative to the thickness of the printing fluid on the developer roller during the second revolution (403-2, 403-4), and the second revolution (403-2, 403-4) is visible as a ghost image on the PIP drum (12) and subsequently on the ITM drum (20) and the print medium (22). In other words, the first revolution (403-1, 403-3) of the developer roller (301) in the example of FIG. 4 has a relatively lower optical density and lower current relative to the second revolution (403-2, 403-4). This may be referred to as negative ghost imaging.

As similarly described herein in connection with FIG. 4, in order to correct the negative ghost imaging depicted in FIG. 5, the controller (380) would function as described in connection with FIG. 3 to adjust the current applied to the cleaner roller (303). Application of the methods performed by the controller (380) would result in the average currents during the first revolution (403-1, 403-3) and the second revolution (403-2, 403-4) becoming equal or approximately equal resulting in the removal or avoidance of image ghosting. The difference between the average current in the first revolution (403-1, 403-3) and the second revolution (403-2, 403-4) may be determined by the controller (380), and the voltage supplied by the power supply (381) to the cleaner roller (303) may be adjusted to remove the image ghosting.

Figure 6:
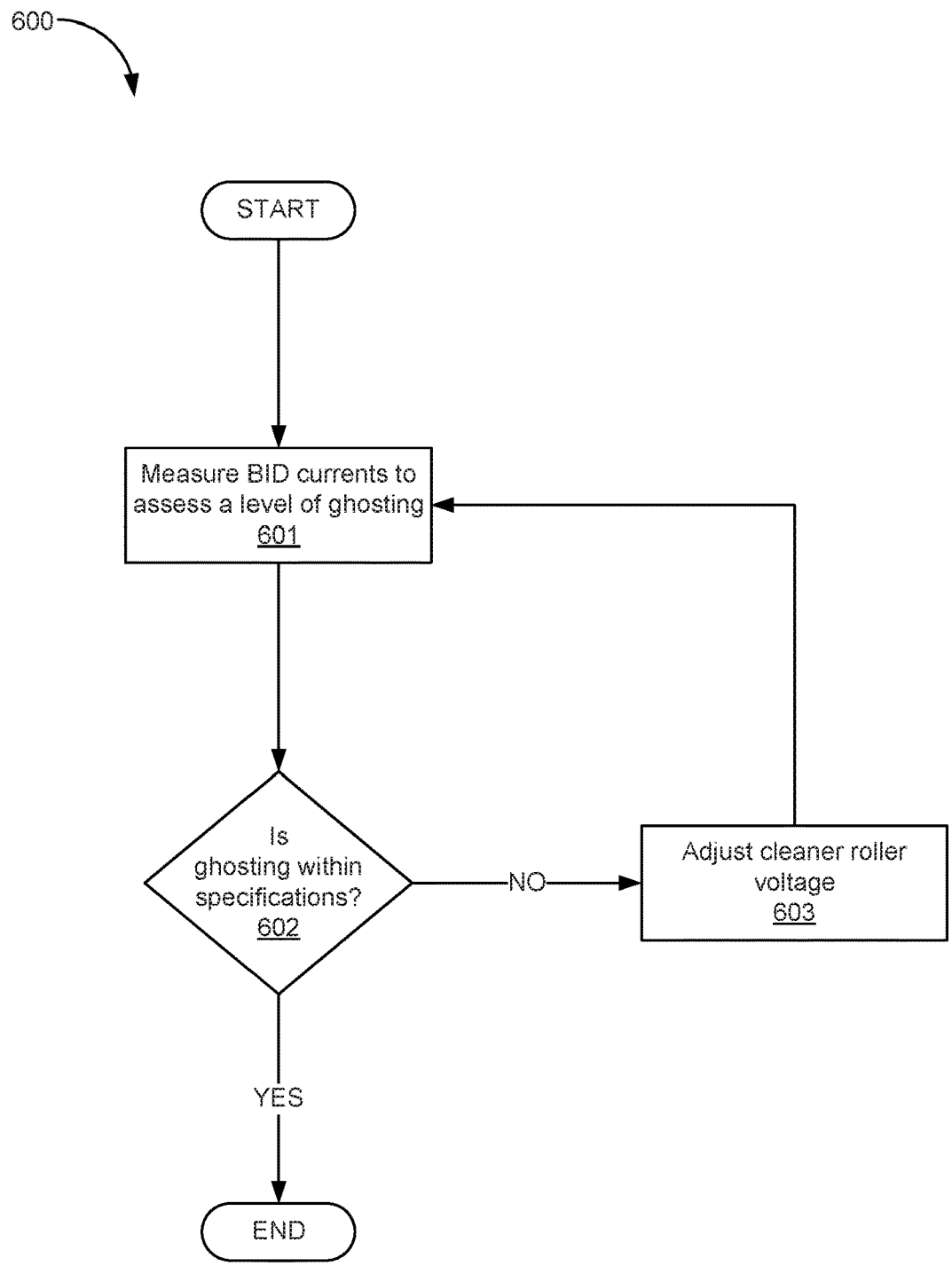
FIG. 6 is a flowchart showing a method of calibrating binary ink developer (BID) currents, according to an example of the principles described herein.

FIG. 6 is a flowchart (600) showing a method of calibrating binary ink developer (BID) currents, according to an example of the principles described herein. The method (600) may include measuring (block 601) a level of image ghosting within a test print based on a sum of currents at the electrodes (307-1, 307-2), the developer roller (301), the squeegee roller (302), and the cleaner roller (303) of a BID (18). It may be determined (block 602) if the image ghosting is within a threshold value. In response to a determination that the image ghosting is not with the threshold value (block 602, determination NO), the controller (380) may adjust (block 603) the voltage applied to the cleaner roller (303). The method (600) may proceed through the closed loop provided by blocks 601 though 603 as many times until it is determined through empirical data obtained by the controller (380) in each loop that the image ghosting is within the threshold value (block 602, determination YES). In this manner, controlling the voltage at the cleaner roller (303) empirically reduces or eliminates image ghosting.

In one example, measuring the level of image ghosting based on the sum of currents at the electrodes (307-1, 307-2), the developer roller (301), the squeegee roller (302), and the cleaner roller (303) may include determining a ghost percentage as described herein. Determining the ghost percentage includes measuring a sum of the currents at the electrodes (307-1, 307-2), the developer roller (301), the squeegee roller (302), and the cleaner roller (303) of the BID (18) at a first revolution (403-1, 403-3) of transfer of printing material from the developer roller (301) to a photo-imaging plate (PIP) drum (12) to obtain a first current sum and measuring a sum of the currents at the electrodes (307-1, 307-2), the developer roller (301), the squeegee roller (302), and the cleaner roller (303) of the BID (18) at a second revolution (403-2, 403-4) of transfer of printing material from the developer roller (301) to a photo-imaging plate (PIP) drum (12) to obtain a second current sum. The first current sum may be divided by the second current sum to obtain a first value. The value of 1 may be subtracted from the first value to obtain a second value, and the second value may be multiplied by 100 to obtain the ghost percentage. In this example, adjusting the voltage to the cleaner roller (303) may include determining an adjusted cleaner roller voltage. Determining the adjusted cleaner roller voltage may include multiplying a ghost percentage as obtained through Equation 1 by a gain value to obtain an adjustment value, and adding the adjustment value to the original voltage at the cleaner roller (303). The gain value represents the adjustment factor for a closed loop control of the voltages supplied to the electrodes (307-1, 307-2), the developer roller (301), the cleaner roller, and/or the squeegee roller (302) of the BID (18). The gain value may be adjusted within the closed loop process provided by the controller (380) in an empirical manner such that detected levels and working gain values may be applied as they work to remove the image ghosting. In this manner, the empirically-obtained gain value provides a fast and stable calibration to the print system (100) in removing the image ghosting.

In one example, measuring the level of image ghosting within the test print may include doing so based on the sum of currents at the electrodes (307-1, 307-2), the developer roller (301), the cleaner roller (303), the squeegee roller (302) of the BID (18), and combinations thereof. Since the squeegee roller (302) and other rollers (301, 303) and the electrodes (307-1, 307-2) all carry an electrical charge, the currents at these elements may be used in determining whether the threshold value is within specification at block 602 and adjusting the voltage to the cleaner roller (303).

The method of FIG. 6 may also include, in response to a determination that the image ghosting is not within the threshold value, determining, with the controller (380), whether a level of image ghosting is positive or negative, and instructing the power supply (381) to provide an adjusted voltage to the cleaner roller to correct a subsequent imprinting of the developer roller (301) on the PIP drum (12). The method (600) may also include electrically biasing the electrodes (307-1, 307-2) and squeegee roller (302) from the developer roller (301) to move the printing fluid to the developer roller (301). As described herein, the printing fluid may be electrically chargeable.

Figure 7:
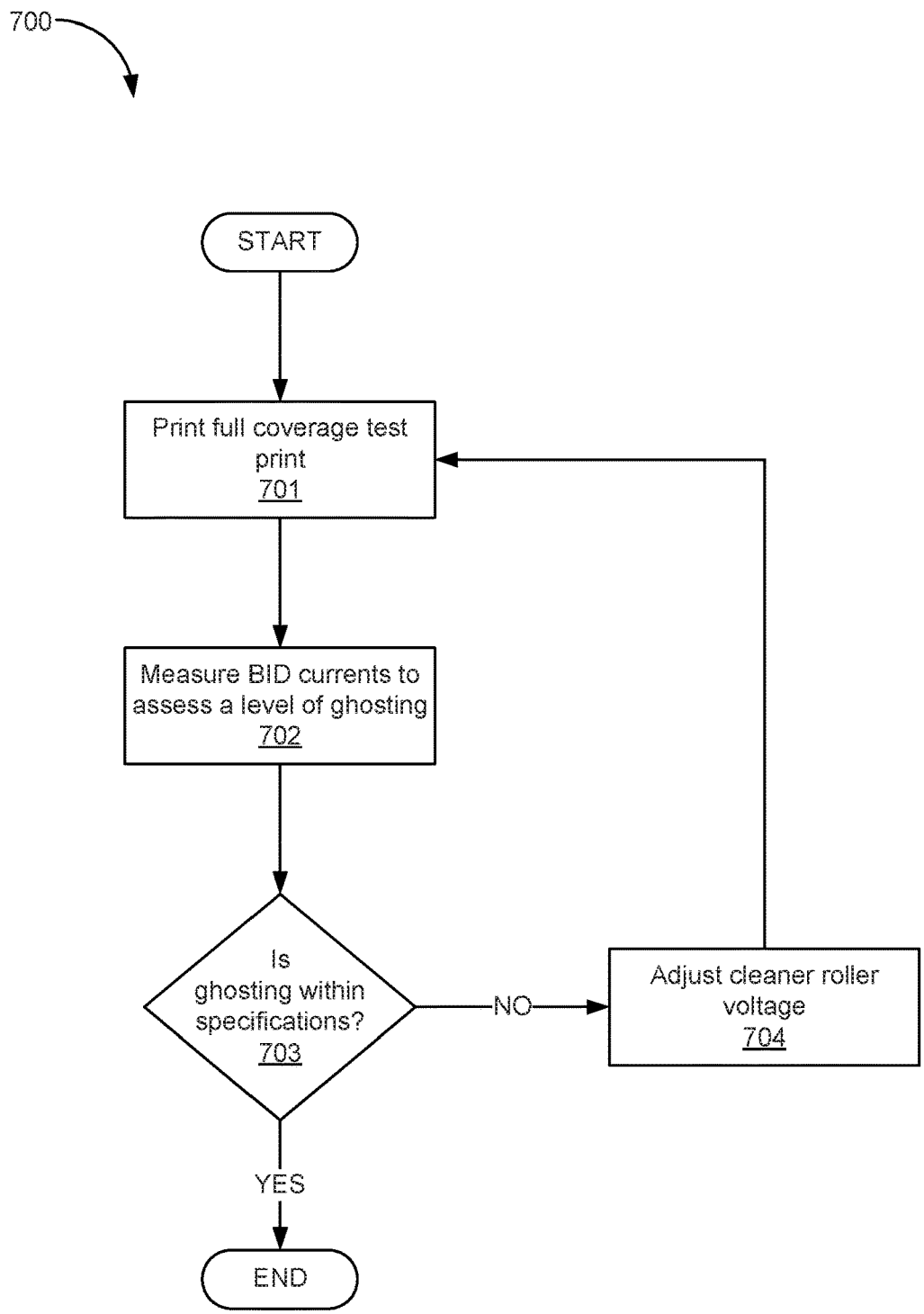
FIG. 7 is a flowchart showing a method of calibrating BID currents, according to an example of the principles described herein.

FIG. 7 is a flowchart showing a method of calibrating BID currents, according to an example of the principles described herein. The method (700) may include with a printing system (100) including at least one BID (18), printing (block 701) a test print, and measuring (block 702) a level of image ghosting based on a sum of currents at the electrodes (307-1, 307-2), the developer roller (301), the squeegee roller (302), and the cleaner roller (303) of a BID (18). It may be determined (block 703) if the image ghosting is with a threshold value. In response to a determination that the image ghosting is not within the threshold value (block 703, determination NO), the controller (380) may adjust (block 704) the voltage applied to the cleaner roller (303). The method (700) may proceed through the closed loop provided by blocks 701 through 704 as may time until it is determined through empirical data obtained by the controller (380) in each loop that the image ghosting is within the threshold value (block 703, determination YES). In this manner, controlling the voltage at the cleaner roller (303) empirically reduces or eliminates image ghosting.

In one example, measuring the level of image ghosting based on the sum of currents at the electrodes (307-1, 307-2), the developer roller (301), the squeegee roller (302), and the cleaner roller (303) may include determining a ghost percentage as described herein. Determining the ghost percentage includes measuring a sum of the currents at the electrodes (307-1, 307-2), the developer roller (301), the squeegee roller (302), and the cleaner roller (303) of the BID (18) at a first revolution (403-1, 403-3) of transfer of printing material from the developer roller (301) to the photo-imaging plate (PIP) drum (12) to obtain a first current sum and measuring a sum of the currents at the electrodes (307-1, 307-2), the developer roller (301), the squeegee roller (302), and the cleaner roller (303) of the BID (18) at a second revolution (403-2, 403-4) of transfer of the printing material from the developer roller (301) to the PIP drum (12) to obtain a second current sum. The first current sum may be divided by the second current sum to obtain a first value. The value of 1 may be subtracted from the first value to obtain a second value, and the second value may be multiplied by 100 to obtain the ghost percentage. In this example, adjusting the voltage to the cleaner roller (303) may include determining an adjusted cleaner roller voltage. Determining the adjusted cleaner roller voltage may include multiplying a ghost percentage as obtained through Equation 1 by a gain value to obtain an adjustment value, and adding the adjustment value to the original voltage at the cleaner roller (303). The gain value represents the adjustment factor for a closed loop control of the voltages supplied to the electrodes (307-1, 307-2), the developer roller (301), the cleaner roller, and/or the squeegee roller (302) of the BID (18). The gain value may be adjusted within the closed loop process provided by the controller (380) in an empirical manner such that detected levels and working gain values may be applied as they work to remove the image ghosting. In this manner, the empirically-obtained gain value provides a fast and stable calibration to the print system (100) in removing the image ghosting.

In one example, measuring the level of image ghosting within the test print may include doing so based on the sum of currents at the electrodes (307-1, 307-2), the developer roller (301), the cleaner roller (303), the squeegee roller (302) of the BID (18), and combinations thereof. Since the squeegee roller (302) and other rollers (301, 303) and the electrodes (307-1, 307-2) all carry an electrical charge, the currents at these elements may be used in determining whether the threshold value is within specification at block 602 and adjusting the voltage to the cleaner roller (303).

The method of FIG. 7 may also include, in response to a determination that the image ghosting is not within the threshold value, determining, with the controller (380), whether a level of image ghosting is positive or negative, and instructing the power supply (381) to provide an adjusted voltage to the cleaner roller to correct a subsequent imprint of the developer roller (301) on the PIP drum (12). The method (600) may also includes include electrically biasing the electrodes (307-1, 307-2) and squeegee roller (302) from the developer roller (301) to move the printing fluid to the developer roller (301). As described herein, the printing fluid may be electrically chargeable.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the controller (380) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a binary ink developer (BID). The BID may include a power supply electrically coupled to an electrode, a developer roller, and a cleaner roller. The BID may also include a controller to determine a level of image ghosting based on a sum of currents at the electrode, the developer roller, the squeegee roller, and the cleaner roller, and instruct the power supply to provide an adjusted voltage to the cleaner roller in response to a determination of the level of image ghosting.

The preceding description has been presented to illustrate and describe examples of the principles described. This description is not intended to be exhaustive or to limit these principles to any precise form disclosed. Many modifications and variations are possible in light of the above teaching.

What is claimed is:

1. A binary ink developer (BID), comprising:
a power supply electrically coupled to an electrode, a developer roller, a squeegee roller, and a cleaner roller; and
a controller to:
determine a level of image ghosting based on a sum of currents at the electrode, the developer roller, the squeegee roller, and the cleaner roller.

2. The BID of claim 1, wherein the controller instructs the power supply to provide an adjusted voltage to the cleaner roller in response to a determination of the level of image ghosting.

3. The BID of claim 1, wherein the controller, in response to a determination that the level of image ghosting is positive or negative, instructing the power supply to provide an adjusted voltage to the cleaner roller to correct a subsequent impression of the developer roller.

4. The BID of claim 1, wherein the controller measures the level of image ghosting based on a current between the developer roller and a photo-imaging plate (PIP) drum.

5. The BID of claim 1, wherein the controller causes the electrode to be electrically biased to move a printing substance to the developer roller, wherein the printing substance is electrically charged.

6. The BID of claim 1, wherein the controller instructs the power supply to provide an adjusted voltage to the developer roller in response to a determination of the level of image ghosting exceeding a threshold value.

7. The BID of claim 1, wherein the controller instructs the power supply to provide an adjusted voltage to the squeegee roller in response to a determination of the level of image ghosting exceeding a threshold value.

8. The BID of claim 1, wherein the controller instructs the power supply to provide an adjusted voltage to the electrode in response to a determination of the level of image ghosting exceeding a threshold value.

9. The BID of claim 1, wherein the controller instructs the power supply to provide an adjusted voltage to the cleaner roller in response to a determination of the level of image ghosting exceeding a threshold value.

10. The BID of claim 1, wherein the controller is to:
compare the determined level of image ghosting to a threshold value; and
in response to the determined level of image ghosting exceeding the threshold value, adjust operation of the power supply to reduce the level of image ghosting.

11. A method of calibrating binary ink developer (BID) currents, comprising:
with a printing device comprising at least one BID, printing a test print;
measuring a level of image ghosting based on either (1) a sum of currents at an electrode, a developer roller, a squeegee roller, and a cleaner roller of the BID and (2)

a current between the developer roller and a photoconductor to receive an image developed by the developer roller;

determining if the image ghosting is within a threshold value; and in response to a determination that the image ghosting is not within the threshold value, adjusting a voltage to the cleaner roller.

12. The method of claim 11 wherein the measuring the level of image ghosting based on the sum of currents at the electrode, the developer roller and the cleaner roller of the BID comprises determining a ghost percentage, wherein determining the ghost percentage comprises:

measuring a sum of the currents at the electrode, the developer roller, the squeegee roller, and the cleaner roller of the BID at a first revolution of transfer of printing material from the developer roller to a photo-imaging plate (PIP) drum to obtain a first current sum;

measuring a sum of the currents at the electrode, the developer roller and the cleaner roller of the BID at a second revolution of transfer of the printing material from the developer roller to the PIP to obtain a second current sum;

dividing the first current sum by the second current sum to obtain a first value;

subtracting 1 from the first value to obtain a second value; and multiplying the second value by 100.

13. The method of claim 12, wherein adjusting the voltage to the cleaner roller comprises determining an adjusted cleaner roller voltage, wherein determining the adjusted cleaner roller voltage comprises:

multiplying the ghost percentage by a gain value to obtain a third value, wherein adjusting the voltage to the cleaner roller comprises adjusting the voltage to the cleaner roller by the third value.

14. The method of claim 13, wherein the gain value is an empirically-determined value.

15. The method of claim 14, applying the adjusted cleaner roller voltage in a closed loop control.

16. A non-transitory computer readable medium comprising computer usable program code embodied therewith, the computer usable program code to, when executed by a processor:

measuring a level of image ghosting within a test print based on a sum of currents at an electrode, a developer roller, a squeegee roller, and a cleaner roller of a binary ink developer (BID);

determining if the image ghosting is within a threshold value; and in response to a determination that the image ghosting is not within the threshold value, empirically adjusting the voltage to the cleaner roller through a closed loop.

17. The computer readable medium of claim 16, wherein:

the measuring the level of image ghosting based on the sum of currents at the electrode, the developer roller, a squeegee roller, and the cleaner roller of the BID comprises determining a ghost percentage, wherein determining the ghost percentage comprises:

measuring a sum of the currents at the electrode, the developer roller, the squeegee roller, and the cleaner roller of the BID at a first revolution of transfer of printing material from the developer roller to a photo-imaging plate (PIP) drum to obtain a first current sum;

measuring a sum of the currents at the electrode, the developer roller, the squeegee roller, and the cleaner roller of the BID at a second revolution of transfer of the printing material from the developer roller to the PIP to obtain a second current sum;

dividing the first current sum by the second current sum to obtain a first value;

subtracting 1 from the first value to obtain a second value; and multiplying the second value by 100; and wherein adjusting the voltage to the cleaner roller comprises determining an adjusted cleaner roller voltage, determining the adjusted cleaner roller voltage comprising:

multiplying the ghost percentage by a gain value to obtain a third value; and wherein adjusting the voltage to the cleaner roller comprises adjusting the voltage to the cleaner roller by the third value.

18. The computer readable medium of claim 16, wherein measuring the level of image ghosting within the test print comprises measuring the level of image ghosting within the test print based on the sum of currents at the electrode, the developer roller, the cleaner roller and a squeegee roller of the BID.

19. The computer readable medium of claim 16, comprising computer usable program code to, when executed by the processor, and in response to a determination that the image ghosting is not within the threshold value:

determine whether a level of image ghosting is positive or negative; and instruct a power supply to provide an adjusted voltage to the cleaner roller to correct a subsequent impression of the developer roller.

20. The computer readable medium of claim 16, comprising computer usable program code to, when executed by the processor, apply the adjusted cleaner roller voltage in a closed loop control.

* * * * *